United States Patent
Nguyen et al.

(10) Patent No.: US 10,457,377 B2
(45) Date of Patent: Oct. 29, 2019

(54) SELF-PERFORATING SPACER FOR AN INSULATION BLANKET OF AN AIRCRAFT, ASSEMBLY METHOD FOR SAID SPACER AND INSULATION BLANKET FOR AN AIRCRAFT FITTED WITH SAID SPACER

(71) Applicant: Airbus Operations S.A.S., Toulouse (FR)

(72) Inventors: Christian Nguyen, Blagnac (FR); Arnaud D'Ouince, Grenade (FR); Serge Blind, Pibrac (FR); Gerard Millet, Pibrac (FR); Thomas Menage, Brest (FR)

(73) Assignee: Airbus Operations S.A.S. (FR)

( * ) Notice: Subject to any disclaimer, the term of this patent is extended or adjusted under 35 U.S.C. 154(b) by 92 days.

(21) Appl. No.: 15/810,459

(22) Filed: Nov. 13, 2017

(65) Prior Publication Data

US 2018/0141635 A1   May 24, 2018

(30) Foreign Application Priority Data

Nov. 22, 2016 (FR) ..................................... 16 61331

(51) Int. Cl.
| | |
|---|---|
| *B64C 1/40* | (2006.01) |
| *F16B 19/08* | (2006.01) |
| *F16B 21/07* | (2006.01) |

(52) U.S. Cl.
CPC ............... *B64C 1/40* (2013.01); *B64C 1/403* (2013.01); *F16B 19/086* (2013.01); *F16B 21/073* (2013.01)

(58) Field of Classification Search
CPC ......... B64C 1/40; B64C 1/403; F16B 21/073; F16B 19/086; F16B 37/14; F16B 37/145; F16B 37/048; B21J 15/022
See application file for complete search history.

(56) References Cited

U.S. PATENT DOCUMENTS

| | | | |
|---|---|---|---|
| 1,887,466 A | 11/1932 | Puc | |
| 3,079,658 A | 3/1963 | Shears et al. | |
| 3,477,336 A * | 11/1969 | Thorpe ................. | F16B 19/086 411/29 |
| 3,895,409 A * | 7/1975 | Kwatonowski ........ | B65D 67/00 16/2.1 |

(Continued)

FOREIGN PATENT DOCUMENTS

| | | |
|---|---|---|
| CN | 104 095 330 B | 12/2015 |
| EP | 2 514 334 A1 | 10/2012 |

(Continued)

OTHER PUBLICATIONS

FR 16 61331 Search Report dated Jul. 26, 2017.

*Primary Examiner* — Robert Sandy
*Assistant Examiner* — Rowland Do
(74) *Attorney, Agent, or Firm* — Lerner, David, Littenberg, Krumholz & Mentlik, LLP

(57) ABSTRACT

A self-perforating spacer has a first part and a second part, the first part including a through-seat, the first and second parts being designed to be assembled together and the self-perforating spacer including a cutting system that cuts when the self-perforating spacer is assembled. A method for assembling a self-perforating spacer on an insulation blanket and an insulation blanket fitted with at least one self-perforating spacer is also described.

9 Claims, 2 Drawing Sheets

(56) References Cited

U.S. PATENT DOCUMENTS

| | | | | |
|---|---|---|---|---|
| 4,490,083 A | * | 12/1984 | Rebish | F16B 5/02 |
| | | | | 411/338 |
| 4,761,860 A | | 8/1988 | Krauss | |
| 5,069,586 A | | 12/1991 | Casey | |
| 7,584,582 B1 | * | 9/2009 | Hutter, III | B64C 1/40 |
| | | | | 156/91 |
| 8,011,619 B2 | * | 9/2011 | Mueller | A62C 2/06 |
| | | | | 244/121 |
| 8,434,982 B2 | * | 5/2013 | Henriksen, Jr. | F16B 37/145 |
| | | | | 411/338 |
| 2016/0183638 A1 | * | 6/2016 | Lu | F16B 5/0642 |
| | | | | 24/581.1 |

FOREIGN PATENT DOCUMENTS

| | | |
|---|---|---|
| EP | 2 530 366 A1 | 12/2012 |
| KR | 2012 0066876 A | 6/2012 |
| WO | 2012/095979 A1 | 7/2012 |

\* cited by examiner

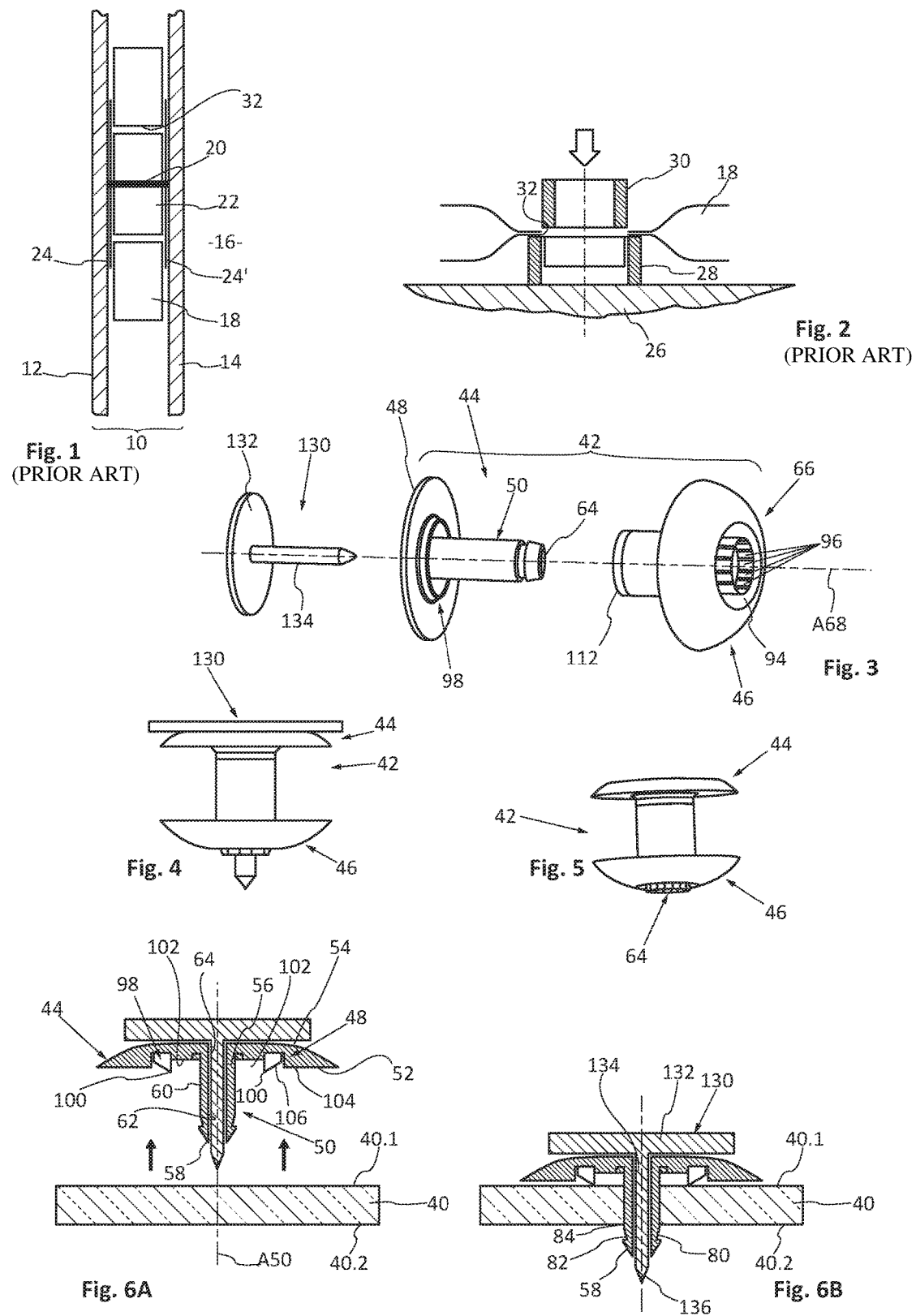

SELF-PERFORATING SPACER FOR AN INSULATION BLANKET OF AN AIRCRAFT, ASSEMBLY METHOD FOR SAID SPACER AND INSULATION BLANKET FOR AN AIRCRAFT FITTED WITH SAID SPACER

FIELD OF THE INVENTION

The present application relates to a self-perforating spacer for an insulation blanket of an aircraft, to an assembly method for said spacer, and to an insulation blanket for an aircraft fitted with said spacer.

BACKGROUND OF THE INVENTION

As shown in FIG. 1, a fuselage of an aircraft 10 includes an outer wall 12 with an outer surface that is in contact with the external environment of the aircraft and an inner wall 14 with an inner surface oriented towards the inside of the fuselage, delimiting a cabin 16. To limit heat losses and to ensure passenger comfort, at least one insulation blanket 18 is arranged between the inner and outer walls 14 and 12.

Elements 20 traverse the insulation blanket 18. For each traversing element 20, the insulation blanket 18 includes a foam spacer 22 designed to prevent the crushing of the insulation blanket 18 about each traversing element 20. This foam spacer 22 is linked to the insulation blanket 18 by two adhesive strips 24, 24' positioned on the faces of the insulation blanket 18.

This foam spacer 22 is built into the insulation blanket 18 in factory. For this purpose, the insulation blanket 18 is positioned on a horizontal table 26, a first die 28 being positioned on the table 26 beneath the insulation blanket 18. A second die 30, positioned above the insulation blanket 18 and directly above the first die 28, is used to perforate the insulation blanket 28 and to form a through-hole 32.

Following withdrawal of the first and second dies 28 and 30 and of the part cut out of the blanket, the foam spacer 22 is positioned in the through-hole 32 and linked to the insulation blanket 18 using adhesive strips 24, 24'.

After assembly of the insulation blanket 18 on the fuselage, if another foam spacer needs to be installed, it is necessary to disassemble several inner walls 14 and to remove the insulation blanket 18 in order to position same flat on a table and to perforate same with two dies 28 and 30. This operation is time consuming and costly.

BRIEF SUMMARY OF THE INVENTION

The present invention may address the drawbacks in the prior art.

For this purpose, the invention relates to a self-perforating spacer, characterized in that it includes a first part that includes a first head and a tube that has a first end that is linked to the first head, a second end that is free and a through-seat that opens out firstly at the first head and secondly at the second end and a second part that includes a second head and a body that extends from the second head to an end face, that includes a conduit that opens out firstly at the second head and secondly at the end face and that is designed to receive the tube of the first part, the self-perforating spacer being designed to assume a disassembled state in which the first and second parts are independent and an assembled state in which the first and second parts are linked and immobilized in relation to one another, the first and second parts having cooperating shapes designed to immobilize, in a fitted and locked state corresponding to the assembled state of the self-perforating spacer, the first and second parts in relation to one another when the tube of the first part is seated in the conduit of the second part that includes a first circular blade positioned on a first face of the first head of the first part and a second circular blade positioned on the end face of the second part, the first and second blades being designed and positioned to cooperate and to cut when the self-perforating spacer is in the assembled state. The self-perforating spacer according to the invention can be positioned on an insulation blanket without having to place same on a table for perforation, which helps to reduce the cost and time required to install spacers.

According to other features, the external diameter of the second blade is equal to the internal diameter of the first blade.

According to one embodiment, the tube of the first part includes a peripheral groove and the second part includes a plurality of tabs that are arranged in a tube shape, that are designed to deform elastically in a radial direction and that each have a hook designed to cooperate with the peripheral groove of the first part in the fitted and locked state.

According to another characteristic, the self-perforating spacer has a sealing gasket positioned between the first and second parts.

According to another characteristic, the sealing gasket is positioned in a groove surrounding the tube.

According to another characteristic, the first and second parts are designed to form a space in the assembled state, inside the first and second blades, between the first and second heads.

The invention also relates to a method for assembling a self-perforating spacer on an insulation blanket, characterized in that it includes a first step comprising perforation and positioning of the first part on the insulation blanket using a first tool that has a head designed to bear against the first part and a pointed cylindrical shaft that extends from the head and that is designed to be seated in the through-seat of the first part and a second step comprising cutting of the insulation blanket and assembly of the first and second parts using a second tool that involves a body that has a bearing surface designed to bear against the second part, the insulation blanket being cut when the body of the second tool and the head of the first tool move towards one another, bringing the self-perforating spacer into the assembled state.

According to another characteristic, the shaft of the first tool is threaded and the body of the second tool has a threaded hole designed to be screwed onto the threaded shaft of the first tool, the screwing of the body of the second tool onto the shaft of the first tool cutting the insulation blanket and bringing the self-perforating spacer into the assembled state.

Finally, the invention also relates to an insulation blanket for an aircraft including at least one self-perforating spacer.

BRIEF DESCRIPTION OF THE DRAWINGS

Other features and advantages are set out in the description of the invention below, given purely by way of example and with reference to the attached drawings, in which:

FIG. 1 is a cross section of a part of a fuselage of an aircraft showing a blanket according to an embodiment in the prior art, FIG. 2 is a diagram showing a perforation step for assembling a foam spacer according to the prior art, FIG. 3 is a perspective view of a self-perforating spacer in the disassembled state showing one embodiment of the invention, FIG. 4 is a perspective view of the self-perforating spacer shown in FIG. 3, in the assembled state with an assembly tool, FIG. 5 is a perspective view of the self-perforating spacer shown in FIG. 3, in the assembled state with no assembly tool, FIGS. 6A to 6G are cross sections showing the different steps of a method for assembling the self-perforating spacer shown in FIG. 3.

DETAILED DESCRIPTION

Figure 6C:
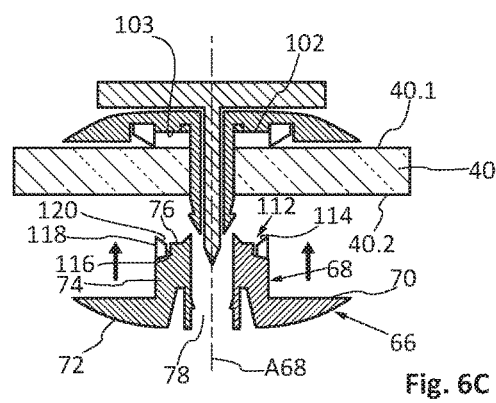

FIGS. 6A to 6G and 7 show an insulation blanket 40 that includes at least one self-perforating spacer 42. This insulation blanket 40 has a first face 40.1 and a second face 40.2.

The self-perforating spacer 42 has a first part 44 and a second part 46, the self-perforating spacer 42 being designed to assume an assembled state in which the first and second parts 44 and 46 are linked and immobilized in relation to one another, and a disassembled state in which the first and second parts 44 and 46 are detached and independent.

The first part 44 includes a first head 48 and a tube 50 that is coaxial with a first axis A50.

According to an embodiment shown notably in FIG. 6A, the first head 48 is disc-shaped and has a flat first face 52 that is substantially perpendicular to the first axis A50 and a slightly convex second face 54 (opposite the first face 52). According to one arrangement, the first head 48 is centred on the first axis A50. According to one arrangement, the first part 44 is circular about the first axis A50. Thus, the tube 50 is centred in relation to the first head 48.

The tube 50 has a first end 56 linked to the first head 48 and a second end 58 that is free. The tube 50 also has a cylindrical outer wall 60 that is coaxial with the first axis A50 and an inner wall 62 that is coaxial with the first axis A50 and that forms a through-seat 64 that opens out firstly at the second face 54 of the first head 48 and secondly at the second end 58 of the tube 50.

Advantageously, the second end 58 is pointed.

According to an embodiment shown notably in FIG. 6C, the second part 46 has a second head 66 and a body 68 that is coaxial with a second axis A68.

The second head 66 is disc-shaped and has a flat first face 70 that is substantially perpendicular to the second axis A68 and a slightly convex second face 72 (opposite the first face 70). According to one arrangement, the second head 66 is centred on the second axis A68. According to one arrangement, the second part 46 is circular about the second axis A68. Thus, the body 68 is centred in relation to the second head 66.

The body 68 is approximately cylindrical and includes an outer wall 74 that is coaxial with the second axis A68 and that extends from the second head 66 to an end face 76 of the body 68 as well as a conduit 78 that is coaxial with the second axis and that opens out firstly at the second face 72 of the second head 66 and secondly at the end face 76.

The diameter of the conduit 78 is substantially equal to the diameter of the tube 50 so that the tube 50 of the first part 44 can be seated in the conduit 68 of the second part 46. When the tube 50 is seated in the conduit 78, the first axis A50 coincides with the second axis A68.

According to one characteristic of the invention, the first and second parts 44 and 46 have cooperating shapes designed to immobilize the first and second parts 44 and 46 in relation to one another when the tube 50 of the first part 44 is seated in the conduit 78 of the second part 46.

Thus, the first and second parts 44 and 46 are designed to assume a disassembled state in which the tube 50 is not seated and/or is not immobilized in the conduit 78 and a fitted and locked state that corresponds to the assembled state of the self-perforating spacer 42 in which the tube 50 is seated in the conduit 78 and immobilized in relation to the conduit 78.

According to an embodiment shown notably in FIG. 6B, the tube 50 has a peripheral groove 80 positioned close to the second end 58. This peripheral groove 80 has a first flank 82 that is perpendicular to the first axis A50 and a second flank 84 that is inclined in relation to the first axis A50.

Figure 6D:
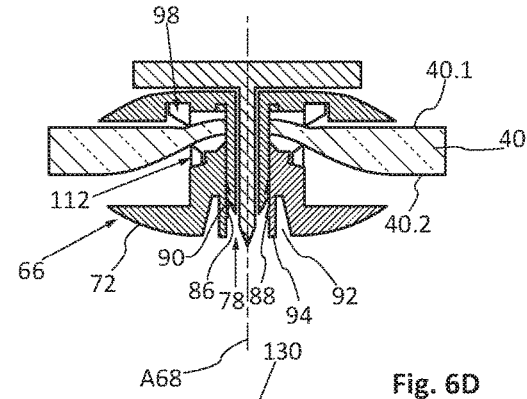

According to an embodiment shown in FIG. 6D, the conduit 78 has at least one hook 86 that is designed to cooperate with the peripheral groove 80 in the fitted and locked state. Thus, the hook 86 has a first flank 88 that is perpendicular to the second axis A68 and designed to bear against the first flank 82 of the peripheral groove 80 and an inclined second flank 90 that cooperates with the second flank 84 of the peripheral groove 80 in the fitted and locked state.

According to another characteristic, the second part 46 has a recess 92 about the conduit 78 that opens out at the second face 72 of the second head 66 and that delimits, with the conduit 78, a thin tube 94. As shown in FIG. 3, this tube 94 has a plurality of slots that are parallel to the second axis A68 and distributed regularly about the periphery of the tube 94. Between two consecutive slots, the tube 94 forms a tab 96 that is designed to deform elastically in a radial direction (perpendicular to the second axis A68). Each tab 96 has a hook 86. If the tabs 96 are not deformed, the hooks 86 of the tabs 96 are seated in the peripheral groove 80 and the tube 50 is in the fitted and locked state. By inserting a tool between the tabs 96 and the tube 50, it is possible to deform the tabs 96 radially, moving same away from the tube 50 to dislodge the hooks 86 from the peripheral groove 80, thereby detaching the first and second parts 44 and 46.

The self-perforating spacer 42 includes a cutting system designed to cut the insulation blanket 40 when the self-perforating spacer 42 moves from the disassembled state to the assembled state. Thus, the cutting system can cut (i.e. is functional) when the self-perforating spacer 42 moves from the disassembled state to the assembled state. The cutting system ceases to be functional when the self-perforating spacer 42 is in the assembled state.

For this purpose, the first part 44 has a first circular blade 98 that is positioned on the first face 52 of the first head 48 and that has a circular cutting edge 100 that is coaxial with the first axis A50 and oriented towards the second part 46.

The first blade 98 has an inner edge 102, an outer edge 104 and a bevelled end 106 (oriented towards the second part 46), the inner edge 102 being taller than the outer edge 104. The edge between the end 106 and the inner edge 102 forms the circular cutting edge 100.

According to one arrangement, the first face 44 has a cylindrical seat 102 that is coaxial with the first axis A50, with a flat bottom 103 that is perpendicular to the first axis A50. The first blade 98 is positioned in the seat 102, the circular cutting edge 100 projecting slightly outside the seat 102.

In addition to the first blade 98, the second part 46 has a second circular blade 112 that is positioned on the end face 76 of the body 68 and that has a circular cutting edge 114 that is coaxial with the second axis A68 and oriented towards the first part 44.

The second blade 112 has an inner edge 116, an outer edge 118 and a bevelled end 120 (oriented towards the first part 44), the outer edge 118 being taller than the inner edge 116. The edge between the end 120 and the outer edge 118 forms the circular cutting edge 114.

The external diameter of the second blade 112 is equal to the internal diameter of the first blade 98.

Figure 6E:
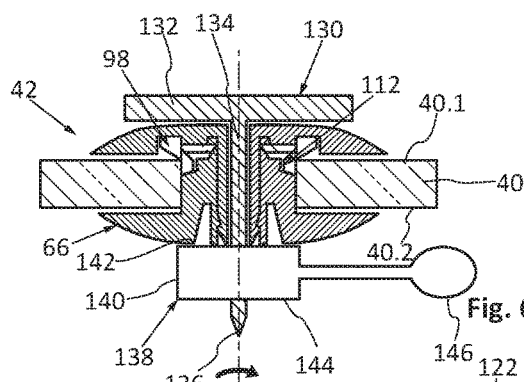
Figure 6F:
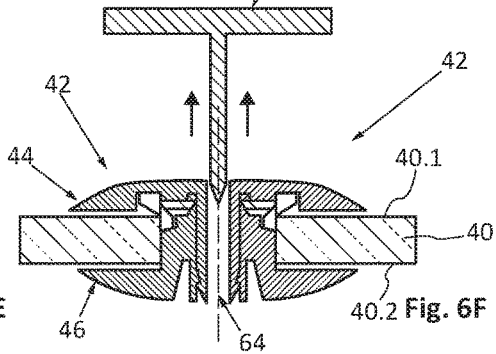
Figure 6G:
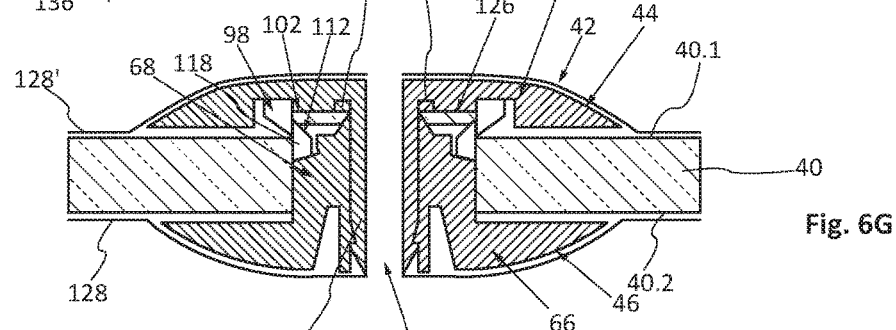
Figure 7:
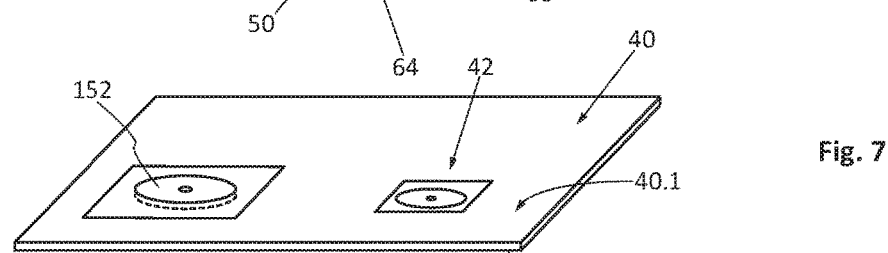
FIG. 7 is a perspective view of an insulation blanket that includes a foam spacer according to the prior art and a self-perforating spacer according to the invention.

Thus, in the assembled state, the inner edge 102 of the first blade 98 of the first part 44 and the outer edge 118 of the second blade 112 are overlapping, as shown in detail in FIG. 6G.

According to one embodiment, the circular cutting edge 100 and/or 114 is continuous and extends in a plane substantially perpendicular to the first and/or second axes A50, A68. According to another embodiment, the circular cutting edge 100 and/or 114 is not continuous but has a saw tooth profile.

According to another characteristic, the self-perforating spacer 42 has a sealing gasket 122 positioned between the first and second parts 44, 46, as shown in FIG. 6G.

The sealing gasket 122 is positioned in a groove surrounding the tube 50 and provided on the bottom 103 of the seat 102. In addition to this, the body 68 has a rib 124 that extends the conduit 78, that projects from the end face 76 and that is designed to compress the sealing gasket 122 when the self-perforating spacer 42 is in the assembled state.

According to another characteristic, the first and second parts 44, 46 are designed to form a space in the assembled state, inside the first and second blades 98, 112, between the heads 48 and 66, to store the part 126 cut out of the insulation blanket 40 when the self-perforating spacer 42 is in the assembled state.

After assembly of the self-perforating spacer 42, the insulation blanket 40 has, for each face 40.1 and 40.2, an adhesive strip 128, 128' that covers the head 48, 66 of the self-perforating spacer 42 and that extends beyond said head 48, 66 over the face 40.1, 40.2 of the insulation blanket 40.

The assembly method of the self-perforating spacer is described with reference to FIGS. 6A to 6G. During a first step, the first part 44 is positioned on the insulation blanket using a first perforation tool 130 from a set of assembly tools. This first perforation tool 130 has a disc-shaped head 132 and a pointed cylindrical shaft 134 that extends from the centre of the head 132 and perpendicular to said head 132. The diameter of the pointed cylindrical shaft 134 is substantially equal to the diameter of the through-seat 64 of the tube 50 of the first part 44 and said shaft is longer than the through-seat 64 such as to project beyond the end 68 of the tube 50 when the pointed cylindrical shaft 134 is inserted into the through-seat 64 of the first part 44 and the head 48 of the first part 44 is bearing against the head 132 of the perforation tool 130.

As shown in FIG. 6A, the perforation tool 130 is inserted into the through-seat 64 of the first part 44.

The pointed end 136 of the perforation tool 130 enables the insulation blanket 40 to be perforated in the desired position. The head 132 of the perforation tool 130 enables sufficient force to be applied to ensure perforation.

The pointed shape of the second end 58 of the tube 50 makes it easier for the tube 50 to pass through the insulation blanket 40, as shown in FIG. 6B.

Once assembled, the first head 48 of the first part 44 is pressed against the first face 40.1 of the insulation blanket 40.

The assembly method includes another step comprising positioning the second part 46 in relation to the first part 44, as shown in FIGS. 6C and 6D. During this step, the tube 50 of the first part 44 is inserted into the conduit 78 of the body 68 until the first and second blades 98, 112 are in contact with the insulation blanket 40.

Subsequently, the insulation blanket 40 is cut and the first and second parts 44 and 46 are assembled using a second pressing tool 138 from the set of assembly tools, as shown in FIG. 6E. This pressing tool 138 includes a body 140 that has a bearing surface 142 that is designed to bear against the head 66 of the second part 44. To cut the insulation blanket 40 and to bring the self-perforating spacer into the assembled state, the body 140 of the pressing tool is brought towards the head 132 of the first perforation tool.

To facilitate this action, the shaft 134 of the first perforation tool 130 is threaded and the body 140 of the second pressing tool 138 has a threaded hole 144 that is designed to screw onto the threaded shaft 134 of the perforation tool 130. Preferably, the threaded hole 144 is centred in relation to the bearing surface 142 and extends in a direction perpendicular to the bearing surface 142.

Advantageously, the second pressing tool 138 has a handle 146 linked to the body 140 that extends radially in relation to the threaded hole 144 to screw the pressing tool 138 onto the threaded shaft 134 of the perforation tool 130.

Screwing the second pressing tool 138 causes the body 140 of the second pressing tool 138 to move towards the head 132 of the first perforation tool 130. This action causes the heads 48 and 66 of the first and second parts 44 and 46 to move together and results in the insulation blanket 40 being cut by the first and second blades 98 and 112. The screwing action is stopped when the hooks 86 of the tabs 96 of the second part 46 are seated in the peripheral groove 80 of the first part 44 and the self-perforating spacer 42 is in the assembled state.

The two tools 130 and 138 are removed as shown in FIG. 6F and the adhesive strips 138 and 128' are attached to the faces 40.1 and 40.2 of the insulation blanket 40, as shown in FIG. 6G.

The through-seat 64 of the self-perforating spacer can be used to receive an element, such as an attachment for example, that passes through the insulation blanket 40. The self-perforating spacer 42 prevents the insulation blanket 40 from being crushed about the through-seat 64.

The self-perforating spacer 42 can be positioned on an insulation blanket 40 without having to place same flat on a table, which helps to reduce the cost and time required to install spacers.

Figure 8:
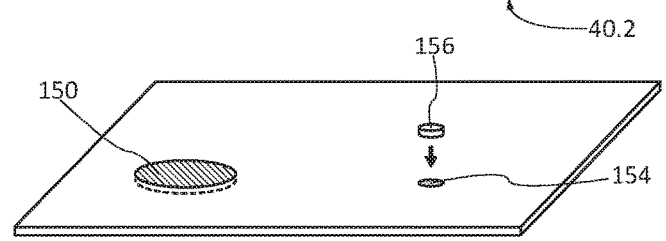
FIG. 8 is a perspective view of an insulation blanket following removal of a foam spacer according to the prior art and a self-perforating spacer according to the invention.

According to another advantage shown in FIG. 8, once a hole 150 occupied by a foam spacer 152 is no longer in use, the entire surface area of the hole 150 can no longer be used. In the case of a self-perforating spacer 42 according to the invention, once the hole 154 is no longer in use, the self-perforating spacer 42 can be disassembled and replaced by a foam disc 156 with a surface area that is clearly less than the surface area of the hole 150.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A self-perforating spacer comprising:
a first part including:
a first head; and
a tube having a first end linked to the first head, a second end that is free and a through-seat opening out firstly at the first head and secondly at the second end;
a second part including:
a second head; and
a body extending from the second head to an end face and including a conduit opening out firstly at the second head and secondly at the end face and configured to receive the tube of the first part,
the self-perforating spacer being configured to assume a disassembled state in which the first and second parts are independent and an assembled state in which the first and second parts are linked and immobilized in relation to one another, the first and second parts having cooperating shapes configured to immobilize, in a fitted and locked state corresponding to the assembled state of the self-perforating spacer, the first and second parts in relation to one another when the tube of the first part is seated in the conduit of the second part,
the spacer further comprising a cutting system including:
a first circular blade positioned on a first face of the first head of the first part; and
a second circular blade positioned on the end face of the second part, the first and second blades being configured and positioned to cooperate and to cut when the self-perforating spacer is in the assembled state, wherein the second circular blade comprises an inner edge, an outer edge, and a beveled end extending between the inner edge and the outer edge and oriented toward the first part in the assembled state.

2. The self-perforating spacer according to claim 1, wherein the external diameter of the second blade is equal to the internal diameter of the first blade.

3. The self-perforating spacer according to claim 1, wherein the tube of the first part includes a peripheral groove, and
wherein the second part includes a plurality of tabs arranged in a tube shape and configured to deform elastically in a radial direction, has a hook configured to cooperate with the peripheral groove of the first part in the fitted and locked state.

4. The self-perforating spacer according to claim 1, further comprising a sealing gasket positioned between the first and second parts.

5. The self-perforating spacer according to claim 4, wherein the sealing gasket is positioned in a groove surrounding the tube.

6. The self-perforating spacer according to claim 1, wherein the first and second parts are configured to form a space in the assembled state, inside the first and second blades, between the first and second heads.

7. A method for assembling a self-perforating spacer on an insulation blanket according to claim 1, the method comprising:
perforation and positioning of the first part on the insulation blanket using a first tool having a head configured to bear against the first part as well as a pointed cylindrical shaft extending from the head and to be seated in the through-seat of the first part; and
cutting of the insulation blanket and assembly of the first and second parts using a second tool having a body that has a bearing surface configured to bear against the second part, the insulation blanket being cut when the body of the second tool and the head of the first tool move towards one another, bringing the self-perforating spacer into the assembled state.

8. The assembly method according to claim 7, wherein the shaft of the first tool is threaded, and
wherein the body of the second tool has a threaded hole configured to be screwed onto the threaded shaft of the first tool, the screwing of the body of the second tool onto the shaft of the first tool cutting the insulation blanket and bringing the self-perforating spacer into the assembled state.

9. An insulation blanket for an aircraft including at least one self-perforating spacer according to one of claim 1.

* * * * *